(12) United States Patent
Sakuma

(10) Patent No.: US 12,160,193 B2
(45) Date of Patent: Dec. 3, 2024

(54) MOTOR CONTROL DEVICE, MOTOR DRIVE CONTROL DEVICE, MOTOR DEVICE, AND MOTOR CONTROL PROGRAM

(71) Applicant: MINEBEA MITSUMI Inc., Nagano (JP)

(72) Inventor: Tomotaka Sakuma, Nagano (JP)

(73) Assignee: MINEBEA MITSUMI In., Nagano (JP)

( * ) Notice: Subject to any disclaimer, the term of this patent is extended or adjusted under 35 U.S.C. 154(b) by 131 days.

(21) Appl. No.: 18/180,973

(22) Filed: Mar. 9, 2023

(65) Prior Publication Data

US 2023/0299707 A1  Sep. 21, 2023

(30) Foreign Application Priority Data

Mar. 16, 2022  (JP) .................. 2022-041670

(51) Int. Cl.
*H02P 29/028* (2016.01)
*H02P 6/06* (2006.01)
*H02P 21/18* (2016.01)

(52) U.S. Cl.
CPC .............. *H02P 29/028* (2013.01); *H02P 6/06* (2013.01); *H02P 21/18* (2016.02)

(58) Field of Classification Search
CPC .......... H02P 27/00; H02P 27/04; H02P 27/06; H02P 27/08; H02P 29/02; H02P 29/024; H02P 29/027; H02P 29/028; H02P 29/032; H02P 29/60; H02P 29/62; H02P 29/64;

(Continued)

(56) References Cited

U.S. PATENT DOCUMENTS

2013/0193894 A1*  8/2013  Kiguchi ................ H02P 29/024
                                                             318/490

FOREIGN PATENT DOCUMENTS

JP  2012-087720 A  5/2012
JP  2013-115392 A  6/2013

* cited by examiner

*Primary Examiner* — Antony M Paul
(74) *Attorney, Agent, or Firm* — Pearne & Gordon LLP

(57) ABSTRACT

Included are a drive control signal generation unit configured to generate a drive control signal for a motor in accordance with a target rotation speed of the motor and a rotation speed of the motor calculated in response to a rotation position detection signal of the motor; a rotation speed signal generation unit configured to generate a rotation speed signal having a frequency corresponding to the rotation speed of the motor, in response to the rotation position detection signal of the motor; an abnormality determination processing unit configured to determine whether a condition value for abnormality determination of the motor has reached a predetermined threshold value, for each predetermined abnormality determination period, and generate an abnormality determination signal distinguishable from the rotation speed signal when the abnormality determination processing unit determines that the condition value has reached the predetermined threshold value; and a signal output unit configured to output the rotation speed signal generated by the rotation speed signal generation unit when the abnormality determination signal is not generated, and output the abnormality determination signal instead of the rotation speed signal when the abnormality determination signal is generated.

9 Claims, 12 Drawing Sheets

(58) Field of Classification Search
CPC ............ H02P 29/66; H02P 29/68; H02P 3/02; Y02P 80/10; G05B 19/0425; G05B 2219/33331

See application file for complete search history.

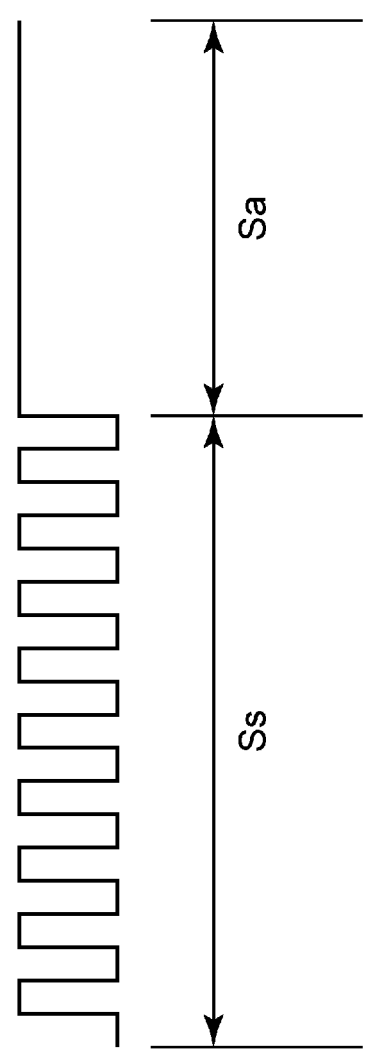

MOTOR CONTROL DEVICE, MOTOR DRIVE CONTROL DEVICE, MOTOR DEVICE, AND MOTOR CONTROL PROGRAM

CROSS-REFERENCE TO RELATED APPLICATIONS

This application claims the benefit of priority to Japanese Patent Application Number 2022-041670 filed on Mar. 16, 2022. The entire contents of the above-identified application are hereby incorporated by reference.

TECHNICAL FIELD

The disclosure relates to a motor control device, a motor drive control device, a motor device, and a motor control program.

BACKGROUND

In general, techniques for predicting and determining the life of a motor by determining an abnormality of the motor of a fan used for cooling a device such as a server device are known (for example, see JP 2012-87720 A and JP 2013-115392 A). In the conventional techniques, a rotation speed signal for notifying an external device of a rotation speed of the motor is switched to a rotation speed signal indicating a specific rotation speed, thereby notifying the external device of an abnormality of the motor.

SUMMARY

In the conventional techniques, an abnormality of a motor is notified to an external device by switching a rotation speed signal to a rotation speed signal indicating a specific rotation speed. Therefore, in the conventional techniques, for example, in a case where a plurality of fan units are used, when the rotation speed of the motor is changed by a factor such as the influence of wind from another fan unit or when an abnormality is to be detected in a motor of which a rotation speed can be changed, the abnormality of the motor cannot be detected by the external device in some cases.

The disclosure has been made in view of the above-described problem as an example, and an object of the disclosure is to provide a motor control device with a simple configuration allowing improvement in the accuracy of an abnormality determination process.

In order to achieve the above object, a motor control device according to the disclosure includes a drive control signal generation unit configured to generate a drive control signal for a motor in accordance with a target rotation speed of the motor and a rotation speed of the motor calculated in response to a rotation position detection signal of the motor; a rotation speed signal generation unit configured to generate a rotation speed signal having a frequency corresponding to the rotation speed of the motor, in response to the rotation position detection signal of the motor; an abnormality determination processing unit configured to determine whether a condition value for abnormality determination of the motor has reached a predetermined threshold value, for each predetermined abnormality determination period, and generate an abnormality determination signal distinguishable from the rotation speed signal when the abnormality determination processing unit determines that the condition value has reached the predetermined threshold value; and a signal output unit configured to output the rotation speed signal generated by the rotation speed signal generation unit when the abnormality determination signal is not generated, and output the abnormality determination signal instead of the rotation speed signal when the abnormality determination signal is generated.

A motor control device according to the disclosure has a simple configuration allowing improvement in the accuracy of an abnormality determination process.

BRIEF DESCRIPTION OF DRAWINGS

FIGS. 4A and 4B are diagrams each illustrating an example of the waveforms of a rotation speed signal and an abnormality determination signal output from a signal output unit of a control circuit.

DESCRIPTION OF EMBODIMENTS

A motor control device, a motor drive control device, a motor device, and a motor control program according to an embodiment of the disclosure are described below with reference to the drawings.

Figure 1:
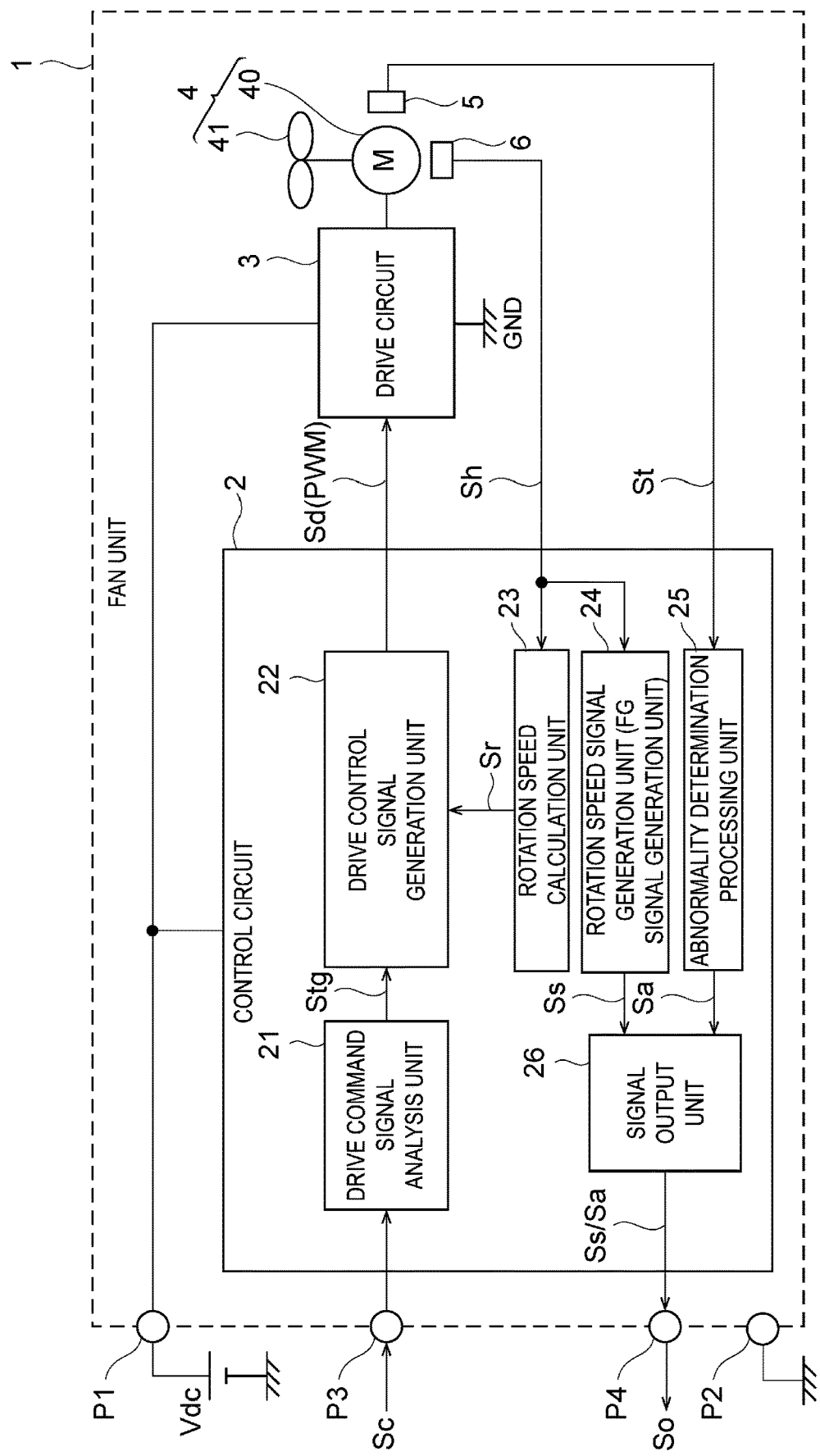
FIG. 1 is a functional block diagram schematically illustrating the configuration of a fan unit as an example of a motor device according to an embodiment of the disclosure.
Figure 2:
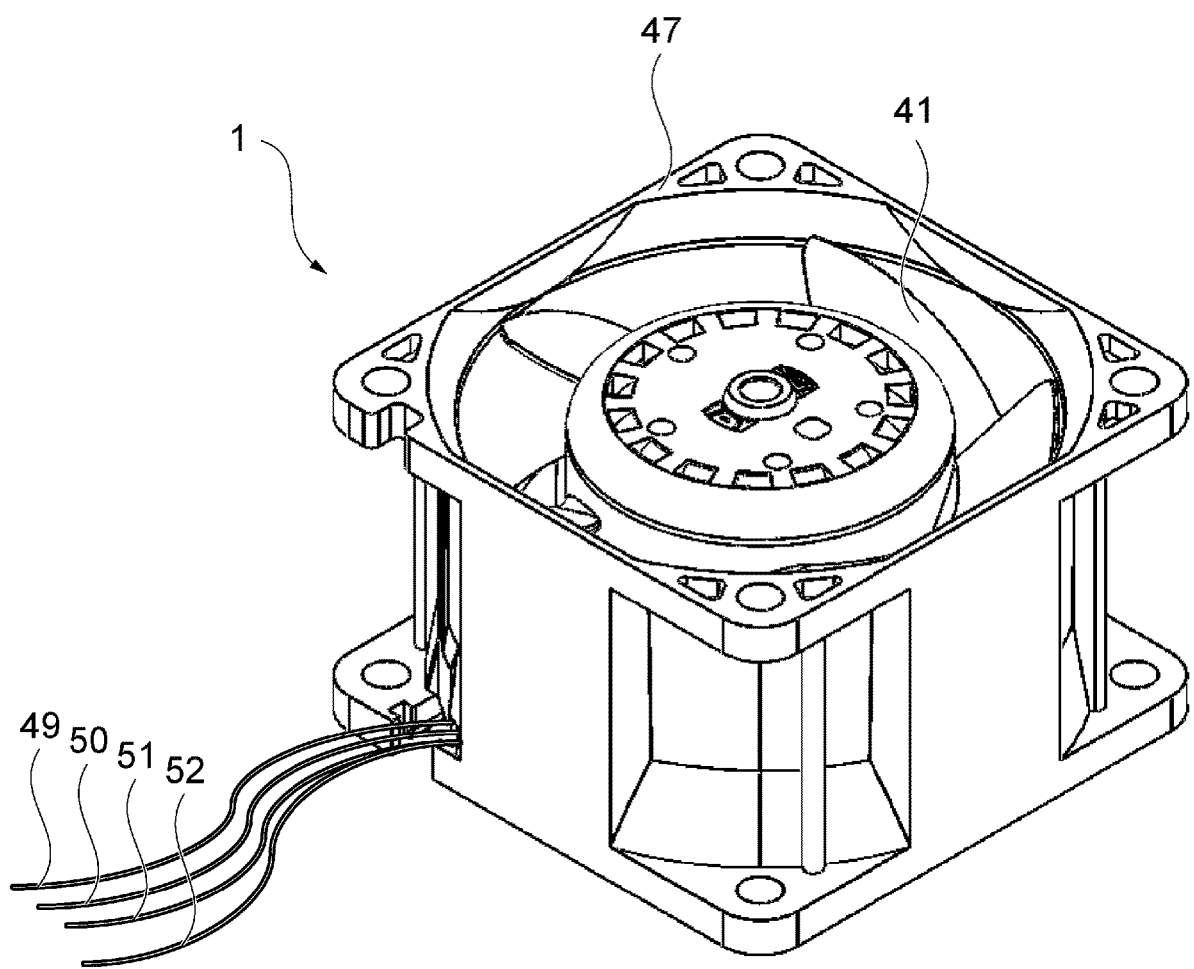
FIG. 2 is a perspective view schematically illustrating the configuration of the fan unit illustrated in FIG. 1.
Figure 3:
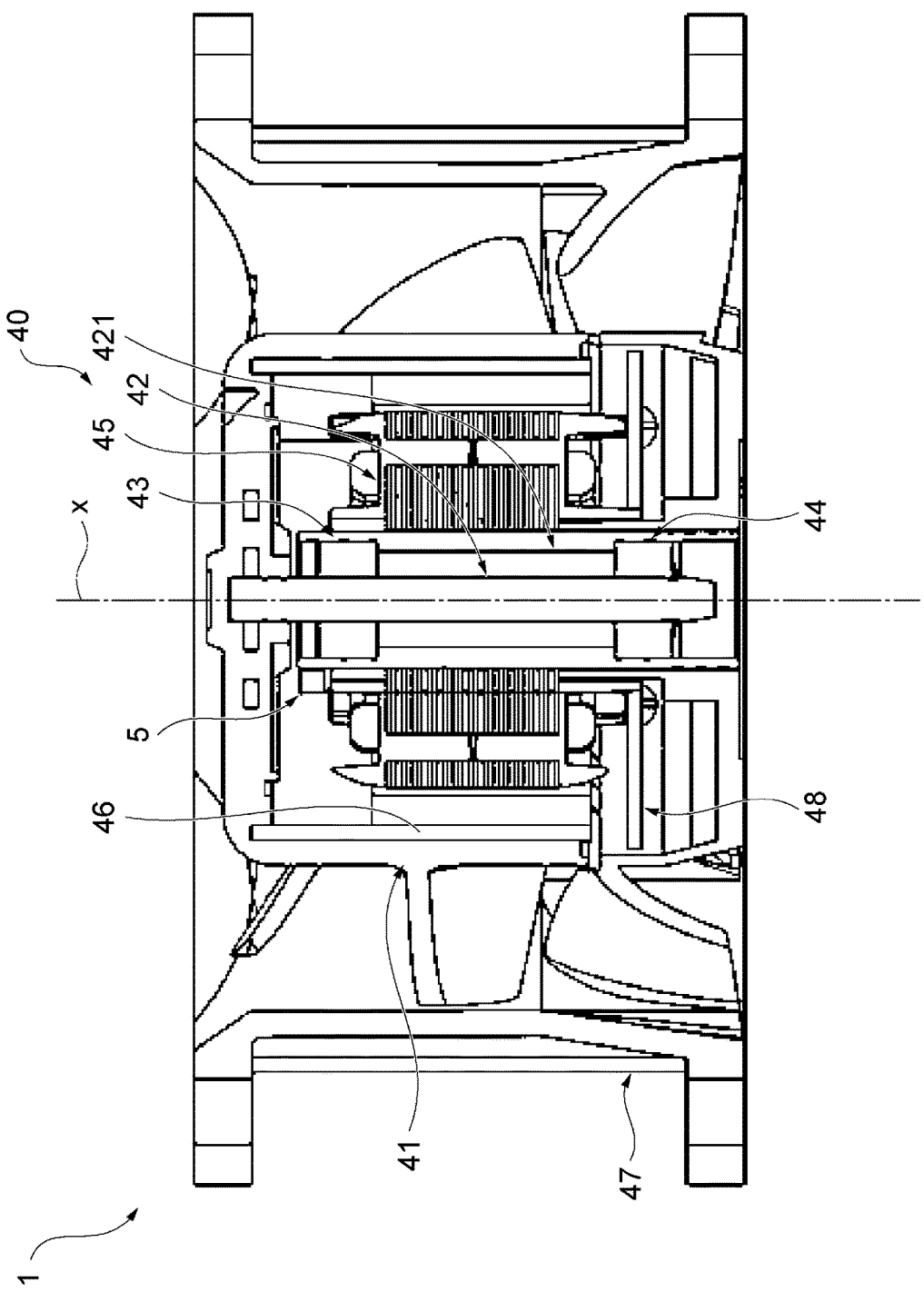
FIG. 3 is a cross-sectional view of the fan unit illustrated in FIG. 2.

FIG. 1 is a functional block diagram schematically illustrating the configuration of a fan unit 1 as an example of a motor device according to an embodiment of the disclosure. FIG. 2 is a perspective view schematically illustrating the configuration of the fan unit 1. FIG. 3 is a cross-sectional view of the fan unit 1.

As illustrated in FIG. 1, the fan unit 1 as an example of the motor device according to the embodiment of the disclosure includes a control circuit 2 as an example of a motor control device, a drive circuit 3, a fan 4, a temperature sensor 5, and a position detector 6. The control circuit 2 and the drive circuit 3 are an example of a motor drive control device according to the embodiment of the disclosure.

In a program processing device (for example, various computers such as a microcontroller) having a configuration including, for example, a processor such as a CPU, various storage devices such as a RAM and a ROM, and peripheral circuits such as a counter (a timer), an A/D conversion circuit, a D/A conversion circuit, a clock generation circuit, and an input/output I/F circuit connected to each other via a bus or a dedicated line, the CPU performs various arithmetic processes according to a program stored in a memory and controls the peripheral circuits such as the A/D conversion circuit and the input/output I/F circuit on the basis of results of the processes, thereby implementing the following functional blocks of the control circuit 2. The fan unit 1 causes the program processing device to execute a motor control program with use of the hardware resources described above; thus, the functional blocks of the control circuit 2, that is, a drive command signal analysis unit 21, a drive control signal generation unit 22, a rotation speed calculation unit 23, a rotation speed signal generation unit (FG signal generation unit) 24, an abnormality determination processing unit 25, and a signal output unit 26 are implemented.

In the motor drive control device in the fan unit 1, the drive circuit 3 and at least some of the functional units of the control circuit 2 may be packaged as one integrated circuit device (IC), or the drive circuit 3 and the functional units of the control circuit 2 may be separately packaged as individual integrated circuit devices.

The drive circuit 3 drives a motor 40 in response to a drive control signal Sd generated by the drive control signal generation unit 22. The drive circuit 3 includes, for example, an inverter circuit and a pre-drive circuit (not illustrated).

The inverter circuit outputs a drive signal to the motor 40 in response to an output signal output from the pre-drive circuit, to cause current to flow through coils included in the motor 40. For example, the inverter circuit is configured such that a pair of series circuits each including two switch elements provided at both ends of a DC power supply are disposed for each phase of coils. In each of the pairs including two switch elements, a terminal of each phase of the motor 40 is connected to a connection point between the switch elements.

The pre-drive circuit generates an output signal for driving the inverter circuit in response to the drive control signal Sd, and outputs the generated output signal to the inverter circuit. The pre-drive circuit generates a drive signal for driving each switch element of the inverter circuit in response to, for example, the drive control signal Sd, and outputs the generated drive signal. When the drive signal turns on/off each switch element included in the inverter circuit, electric power is supplied to each phase of the motor 40, and a rotor of the motor 40 rotates.

As illustrated in FIGS. 2 and 3, in the fan unit 1, the fan 4 includes the motor 40 and an impeller 41 attached to a rotation axis 42 of the motor 40. As illustrated in FIG. 3, in the fan 4, the motor 40 is disposed inside a hub of the impeller 41.

The motor 40 is, for example, an outer rotor type brushless direct current (DC) motor, and the rotor is constituted by the rotation axis 42 and the impeller 41 connected to the rotation axis 42 and rotated by a rotational force of the motor 40. The motor 40 includes bearings 43 and 44, a stator 45, a magnet 46, a casing 47, a circuit board 48, and the like, in addition to the rotation axis 42 described above. The motor 40 further includes the temperature sensor 5 and the position detector 6 illustrated in FIG. 1.

The rotation axis 42 is a rod-shaped member disposed with an axis x direction as a longitudinal direction. The bearings 43 and 44 are supported by a bearing support part 421 at a central portion of the casing 47. The rotation axis 42 is rotatably supported by the bearings 43 and 44. Each of the bearings 43 and 44 includes an inner ring, an outer ring, and rolling elements.

The stator 45 is fixed, for example, near a central portion of the rotation axis 42 in the axis x direction of the casing 47. The stator 45 includes, for example, a stator core formed by layering a plurality of electromagnetic steel sheets, a coil wound around the stator core via an insulator, and the like. The magnet 46 is provided having a predetermined gap with the stator 45. The circuit board 48 is, for example, a printed circuit board (PCB). In the circuit board 48, electronic components included in the control circuit 2 and the drive circuit 3 for controlling the operation of the motor 40 in the fan unit 1 are mounted at a substrate made of an insulating material with conductor wiring.

The temperature sensor 5 is provided around a rotating portion of the motor 40, for example, at the outer peripheral side of the bearings 43 and 44. Examples of the temperature sensor 5 are various temperature detection sensors such as a thermistor. The temperature sensor 5 outputs an electric signal corresponding to a detected temperature.

The position detector 6 detects a rotation position of the rotation axis 42 of the motor 40. The position detector 6 is, for example, a Hall element. The position detector 6 outputs a position detection signal (Hall signal) Sh to the rotation speed calculation unit 23 and the rotation speed signal generation unit 24. The position detector 6 only needs to be able to detect position information of the rotation axis 42 and output the detected position information as an electric signal, and may be, for example, a rotary encoder.

As illustrated in FIG. 1, the fan unit 1 includes a power supply terminal P1 electrically connected to the drive circuit 3, a ground terminal P2, a signal input terminal P3, and a signal output terminal P4 electrically connected to the signal output unit. A power supply line 49 illustrated in FIG. 2 is connected to the power supply terminal P1. A ground line 50 illustrated in FIG. 2 is connected to the ground terminal P2. An input signal line 51 illustrated in FIG. 2 is connected to the signal input terminal P3. An output signal line 52 illustrated in FIG. 2 is connected to the signal output terminal P4.

The functional units constituting the control circuit 2 are described in detail below.

The drive command signal analysis unit 21 acquires information on a target rotation speed Stg from a drive command signal Sc (for example, a pulse width modulation (PWM) signal) input from the signal input terminal P3. The drive command signal analysis unit 21 outputs the acquired information on the target rotation speed Stg to the drive control signal generation unit 22.

The rotation speed calculation unit 23 calculates a rotation speed Sr of the motor 40 in response to the rotation position detection signal (Hall signal) Sh of the motor 40 output from the position detector 6. The rotation speed calculation unit 23 outputs the calculated rotation speed Sr of the motor 40 to the drive control signal generation unit 22.

The drive control signal generation unit 22 generates a drive control signal for the motor 40 in accordance with the target rotation speed Stg of the motor 40 and the rotation speed Sr of the motor 40. Specifically, the drive control signal generation unit 22 calculates an error between the target rotation speed Stg and the rotation speed Sr of the motor, calculates an operation amount of the motor 40 such that the error becomes 0 by, for example, a proportional integral differential (PID) control calculation, generates a PWM signal having a duty ratio corresponding to the calculated operation amount, and outputs the generated PWM signal as the drive control signal Sd. When performing control by open-loop control to rotate the motor 40 with a constant force without maintaining the rotation speed of the motor 40, the drive control signal generation unit 22 generates a PWM signal having a duty ratio corresponding to an operation amount for maintaining a predetermined rotation speed and outputs the generated PWM signal as the drive control signal Sd.

The rotation speed signal generation unit 24 generates a rotation speed signal Ss (FG signal) having a frequency corresponding to the rotation speed of the motor 40, in response to the rotation position detection signal Sh of the motor 40. Specifically, the rotation speed signal Ss is a periodic signal, such as a pulse signal, output at intervals according to the rotation speed of the motor 40. The rotation speed signal Ss is a periodic signal having a frequency corresponding to the rotation speed of the motor 40, and thus may be, for example, sine waves.

The abnormality determination processing unit 25 determines whether a condition value for abnormality determination of the motor 40 has reached a predetermined threshold value, for each predetermined abnormality determination period. Specifically, the abnormality determination processing unit 25 determines whether an electric signal corresponding to the temperature output from the temperature sensor 5 attached in the vicinity of the bearings 43 and 44 of the motor 40 has reached the predetermined threshold value (the upper limit of the temperature). When the abnormality determination processing unit 25 determines that the condition value has reached the predetermined threshold value, the abnormality determination processing unit 25 generates an abnormality determination signal Sa distinguishable from the rotation speed signal Ss of the motor 40. The abnormality determination signal Sa is a signal indicating that, when the detected temperature of the bearings 43 and 44 of the motor 40 exceeds the threshold value, the life of the motor 40 is close to the end due to an abnormality in the motor 40 of the fan unit 1.

The rotation speed signal Ss and the abnormality determination signal Sa are input to the signal output unit 26. The signal output unit 26 outputs one of the rotation speed signal Ss and the abnormality determination signal Sa to the signal output terminal P4. When the abnormality determination signal Sa is not generated, the signal output unit 26 outputs the rotation speed signal Ss generated by the rotation speed signal generation unit 24 to the signal output terminal P4. On the other hand, when the abnormality determination signal Sa is generated, the signal output unit 26 outputs the abnormality determination signal Sa to the signal output terminal P4 instead of the rotation speed signal Ss.

Figure 4B:
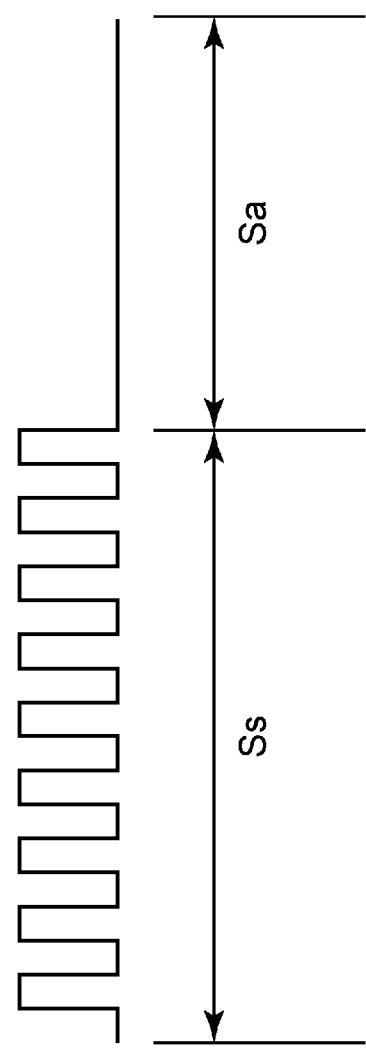

FIGS. 4A and 4B are diagrams each illustrating an example of the waveforms of the rotation speed signal Ss and the abnormality determination signal Sa output from the signal output unit 26. As illustrated in FIGS. 4A and 4B, the signal output unit 26 can output the abnormality determination signal Sa instead of the rotation speed signal Ss after outputting the rotation speed signal Ss. The rotation speed signal Ss is a pulse signal including a high voltage signal (HI signal) and a low voltage signal (LO signal) alternately output at intervals according to the rotation speed of the motor 40 as described above. As the abnormality determination signal Sa, a non-periodic signal is output so as to be distinguishable from the rotation speed signal Ss. As the abnormality determination signal Sa, for example, a signal having the same level as the HI signal of the rotation speed signal Ss is continuously output for a predetermined time in FIG. 4A, and a signal having the same level as the LO signal of the rotation speed signal Ss is continuously output for a predetermined time in FIG. 4B. As the abnormality determination signal Sa, one periodic signal is output in one abnormality determination period.

Figure 5A:
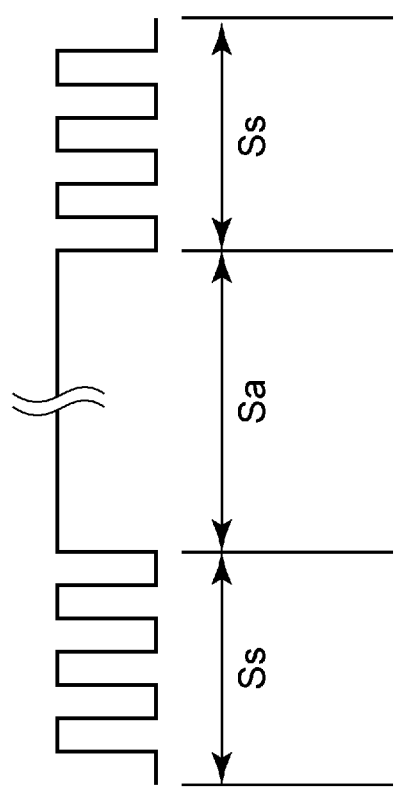
FIGS. 5A and 5B are diagrams each illustrating another example of the waveforms of the rotation speed signal and the abnormality determination signal output from the signal output unit of the control circuit.
Figure 5B:
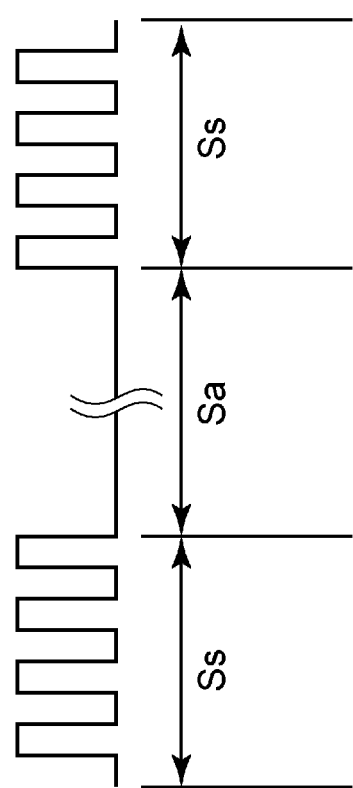

FIGS. 5A and 5B are diagrams each illustrating another example of the waveforms of the rotation speed signal Ss and the abnormality determination signal Sa output from the signal output unit 26. As illustrated in FIGS. 5A and 5B, the signal output unit 26 can alternately output the rotation speed signal Ss and the abnormality determination signal Sa. As in the examples illustrated in FIGS. 4A and 4B, as the abnormality determination signal Sa, for example, a signal having the same level as the HI signal of the rotation speed signal Ss illustrated in FIG. 5A or a signal having the same level as the LO signal of the rotation speed signal Ss illustrated in FIG. 5B can be output. As illustrated in FIGS. 5A and 5B, since the signal output unit 26 alternately outputs the rotation speed signal Ss and the abnormality determination signal Sa, the rotation speed signal Ss and the abnormality determination signal Sa when the motor 40 fails and the output becomes constant are distinguishable from each other.

Figure 6:
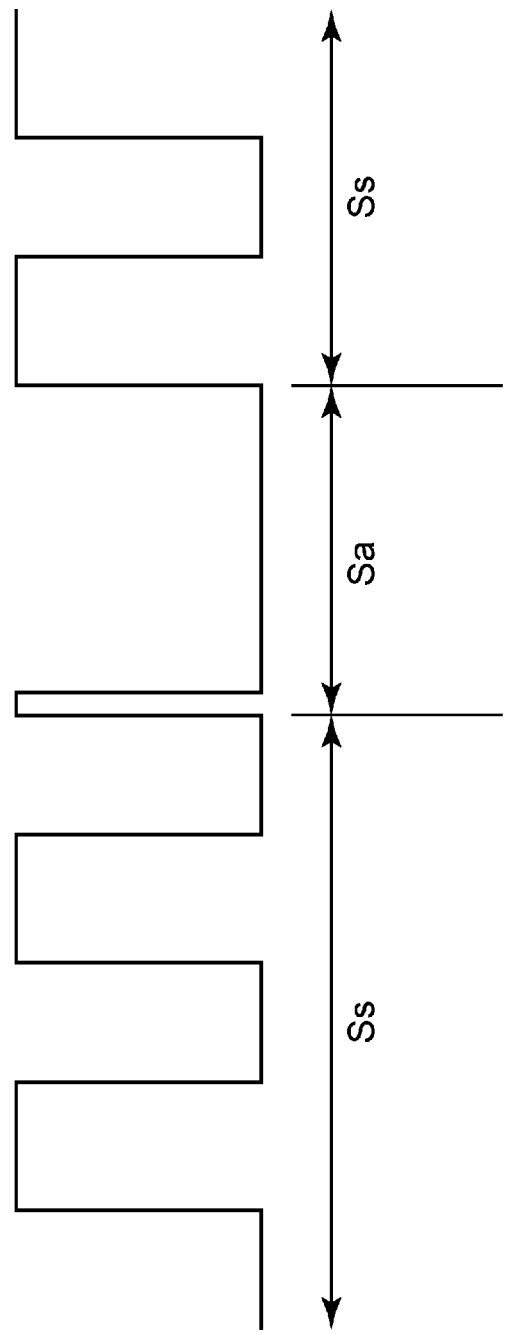
FIG. 6 is a diagram illustrating still another example of the waveforms of the rotation speed signal and the abnormality determination signal output from the signal output unit of the control circuit.

FIG. 6 is a diagram illustrating still another example of the waveforms of the rotation speed signal Ss and the abnormality determination signal Sa output from the signal output unit 26. As illustrated in FIG. 6, after outputting the rotation speed signal Ss, the signal output unit 26 outputs, instead of the rotation speed signal Ss, the abnormality determination signal Sa, for example, a signal having the same level as the HI signal of the rotation speed signal Ss only once in a time (irregular period) shorter than the period of the rotation speed signal Ss, so that the abnormality determination signal Sa is distinguishable from the rotation speed signal Ss. For the normal rotation speed signal Ss, when the rotation speed is constant, the ratio of the output time of the HI signal to the output time of the LO signal per period is 1:1, but in the irregular period, the ratio of the output time of the HI signal to the output time of the LO signal is not 1:1. As illustrated in FIG. 6, since the signal output unit 26 outputs the abnormality determination signal Sa in the irregular period, the rotation speed signal Ss and the abnormality determination signal Sa when the motor 40 fails and the output becomes constant are distinguishable from each other.

Figure 7:
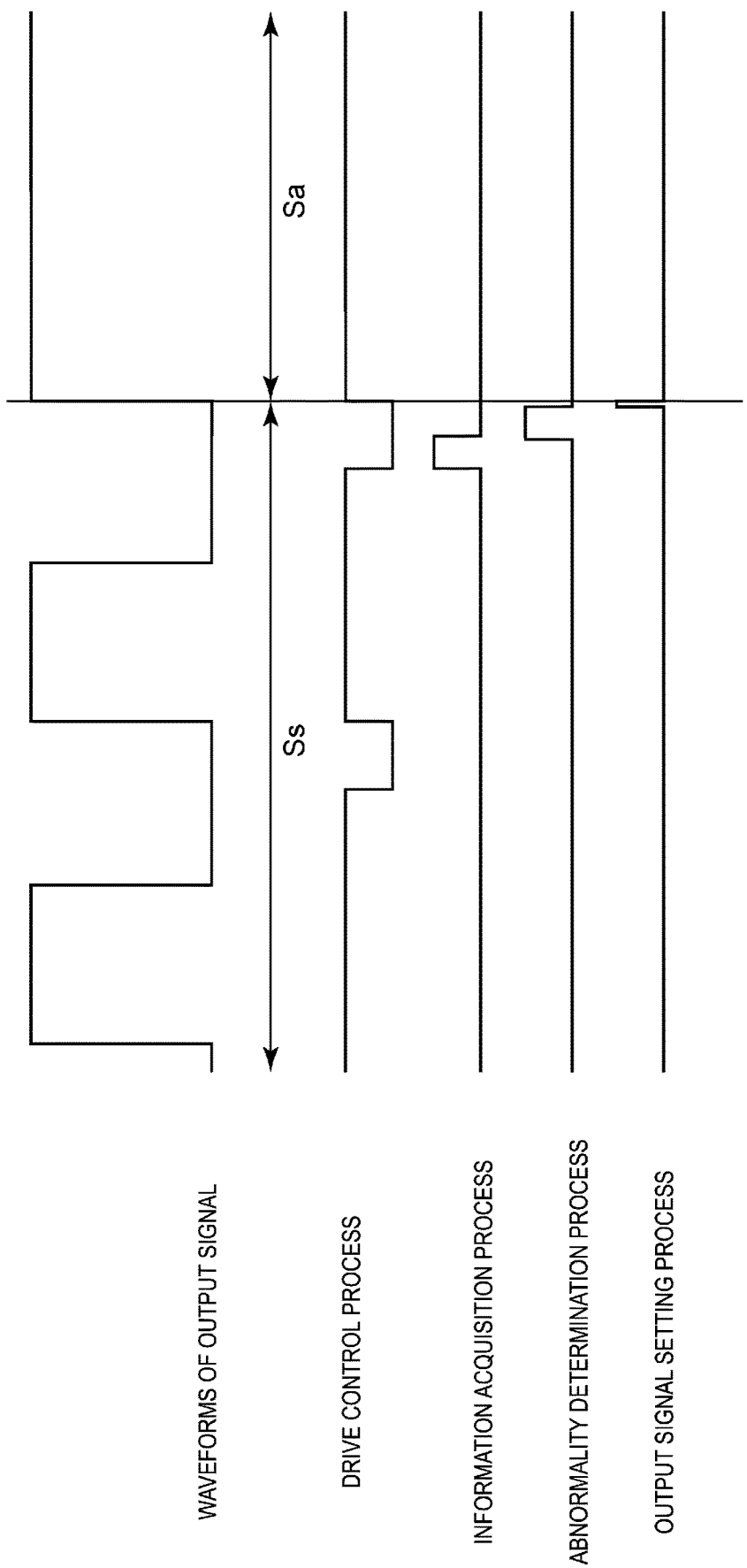
FIG. 7 is an example of a timing chart of a control process in a control circuit illustrated in FIG. 1.

FIG. 7 is an example of a timing chart of a control process in the control circuit 2. The timing chart shown in FIG. 7 shows the relationship between the waveforms of the rotation speed signal Ss and the abnormality determination signal Sa output from the signal output terminal P4 and the periods of a drive control process, an information acquisition process, an abnormality determination process, and a process of setting for outputting the abnormality determination signal Sa by the signal output unit 26. As shown in FIG. 7, in the control circuit 2, when the rotation speed of the motor 40 is 15000 rpm, an execution period of the drive control by the drive control signal generation unit 22 is 2 ms, an execution period of the process of acquiring information from the temperature sensor 5 by the abnormality determination processing unit 25 is 500 ms, and an execution period of the abnormality determination process by the abnormality determination processing unit 25 is 1 s. That is, in the timing chart shown in FIG. 7, the abnormality determination process is performed once by the abnormality determination processing unit 25 every time the information from the temperature sensor 5 is acquired twice.

Figure 8:
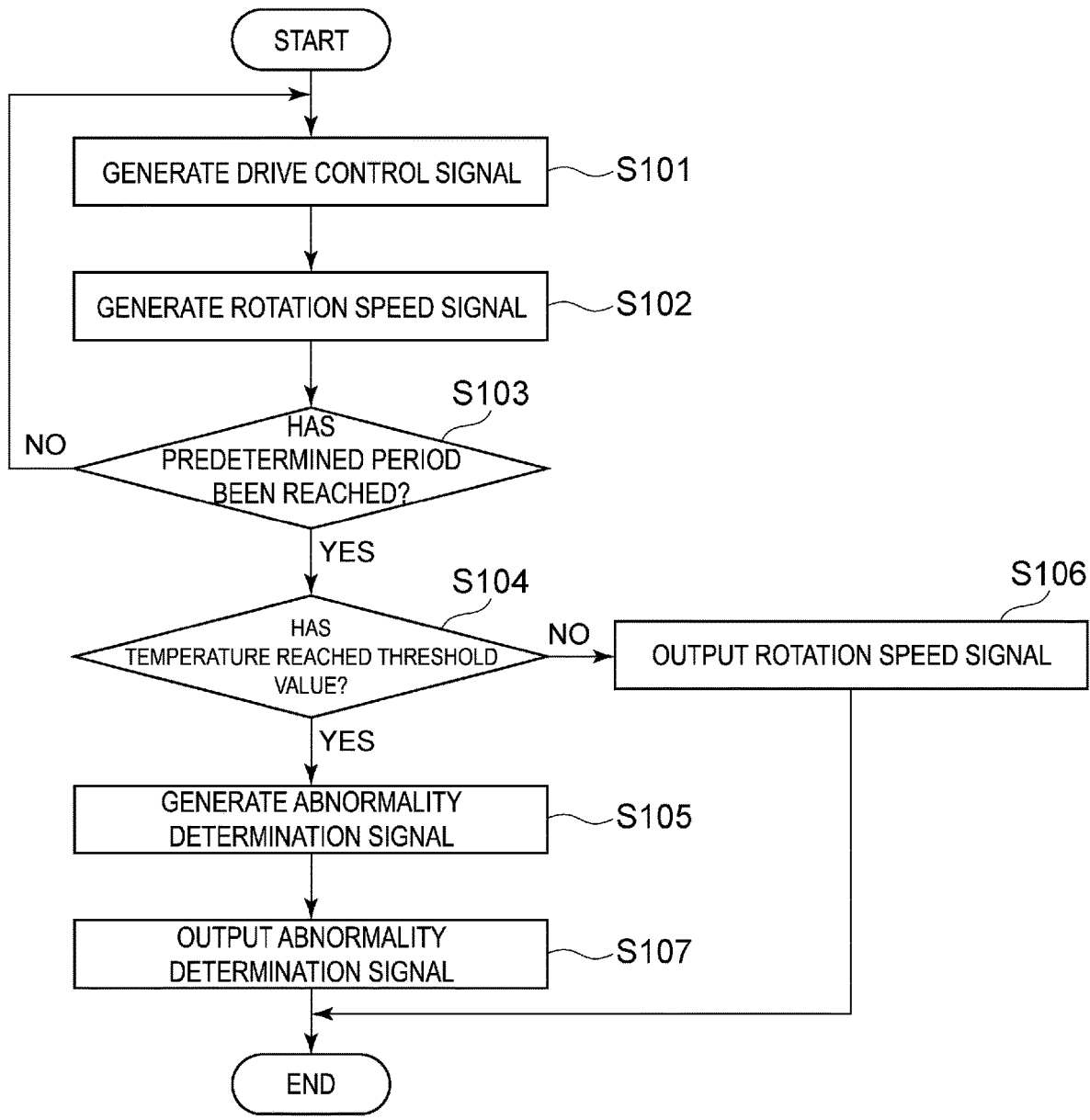
FIG. 8 is an example of a flowchart of the control process in the control circuit illustrated in FIG. 1.

FIG. 8 is an example of a flowchart of the control process in the control circuit 2. The process in the control circuit 2 described above is described with reference to the flowchart shown in FIG. 8.

The drive control signal generation unit 22 generates a motor drive control signal in accordance with the target rotation speed of the motor 40 and the rotation speed of the motor 40 calculated in response to the rotation position detection signal of the motor 40 (step S101).

The rotation speed signal generation unit 24 generates the rotation speed signal Ss having a frequency corresponding to the rotation speed of the motor 40, in response to the rotation position detection signal of the motor 40 (step S102).

The abnormality determination processing unit 25 determines whether a predetermined period for performing the abnormality determination process as illustrated in FIG. 7 has been reached (step S103). When the predetermined period for performing the abnormality determination process has not been reached (S103: NO), the abnormality determination process is not performed and the process by the control circuit 2 returns to S101.

On the other hand, when the predetermined period for performing the abnormality determination process has been reached (S103: YES), the abnormality determination processing unit 25 determines whether the temperature in the vicinity of the bearings 43 and 44 of the motor 40 acquired by the temperature sensor 5 has reached a predetermined threshold value (step S104).

When determining that a condition value has reached the predetermined threshold value (S104: YES), the abnormality determination processing unit 25 generates the abnormality determination signal Sa (step S105).

When determining that the condition value has not reached the predetermined threshold value (S104: NO), the abnormality determination processing unit 25 does not generate the abnormality determination signal Sa and the process of the signal output unit 26 is performed. When the abnormality determination signal Sa is not generated, the signal output unit 26 outputs the rotation speed signal Ss generated by the rotation speed signal generation unit 24 (step S106).

When the abnormality determination signal Sa is generated, the signal output unit 26 outputs the abnormality determination signal Sa instead of the rotation speed signal Ss (step S107). When the process of S106 or S107 ends, the control circuit 2 ends the abnormality determination process.

In the control circuit 2 configured as described above, the signal output unit 26 outputs the abnormality determination signal Sa instead of the rotation speed signal Ss when the abnormality determination signal Sa is generated by the abnormality determination processing unit 25. Therefore, the fan unit 1 including the control circuit 2 can output the abnormality determination signal Sa to an external device without adding a terminal and a lead wire for outputting the abnormality determination signal Sa even though the fan unit 1 includes four lead wires of the power supply line connected to the power supply terminal P1, the ground line connected to the ground terminal P2, the input signal line connected to the signal input terminal P3, and the output signal line connected to the signal output terminal P4 as illustrated in FIGS. 1 and 2.

The process of outputting the abnormality determination signal Sa instead of the rotation speed signal Ss in the fan unit 1 described above is particularly effective when the control of the rotation speed of the motor 40 by the drive control signal generation unit 22 is performed by open-loop control for rotating the motor 40 with a constant force without maintaining the rotation speed of the motor 40. In the open-loop control, since the rotation speed of the motor 40 is not fed back, the rotation speed of the motor 40 is changed by the influence of wind from the outside, for example. In this case, in the process implemented by the control circuit 2 of the fan unit 1 described above, the abnormality determination signal Sa output from the signal output unit 26 is distinguishable from the rotation speed signal Ss. Therefore, the process implemented by the control circuit 2 of the fan unit 1 described above can prevent the abnormality determination signal Sa from being erroneously detected as the rotation speed signal Ss by an external device.

Consequently, the control circuit 2 provided with the abnormality determination processing unit 25 and the signal output unit 26 can perform, with a simple configuration, the abnormality determination process with improved accuracy.

Figure 9:
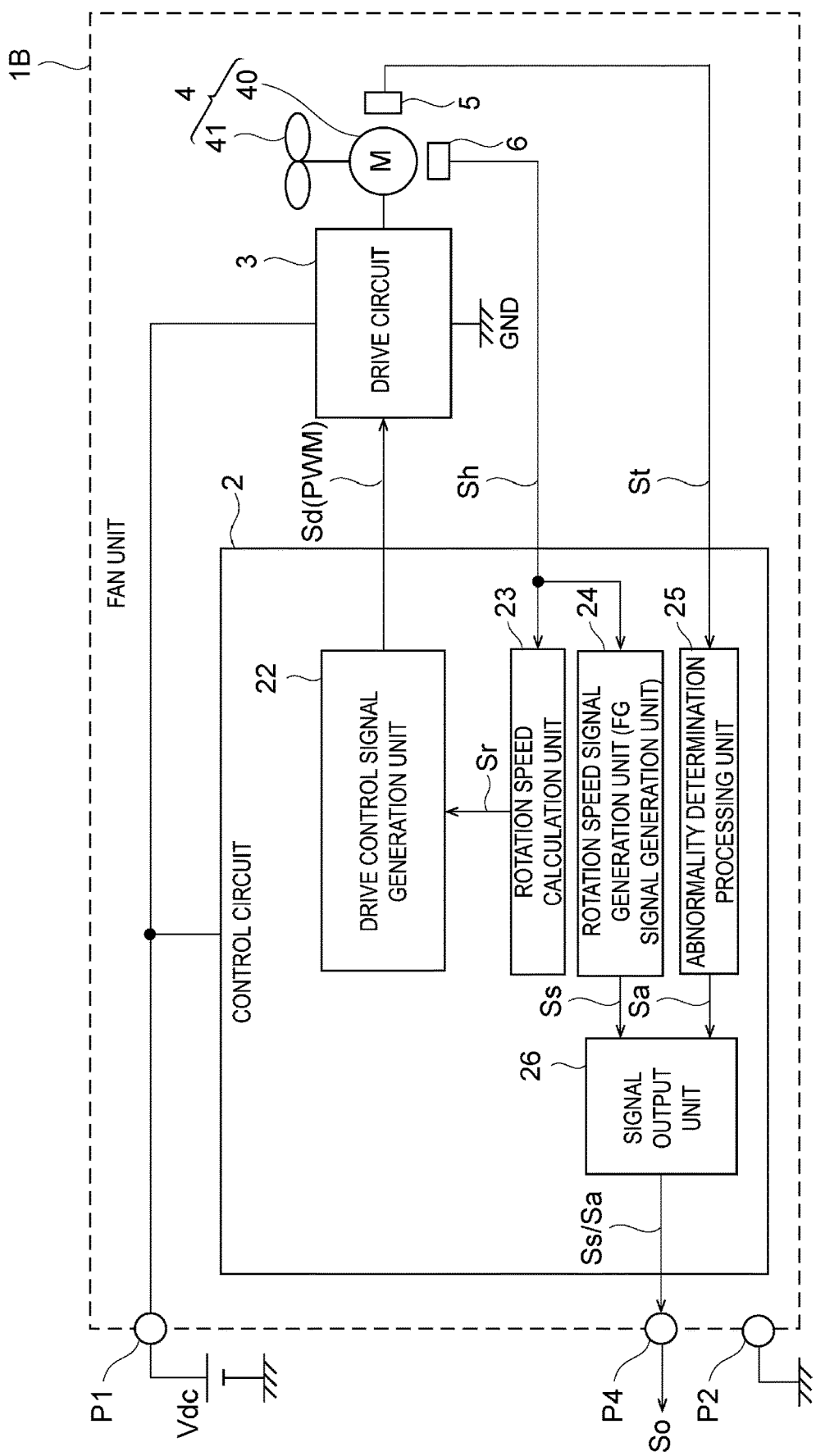
FIG. 9 is a functional block diagram schematically illustrating the configuration of a fan unit as a modification of the motor device according to the present embodiment.

FIG. 9 is a functional block diagram schematically illustrating the configuration of a fan unit 1B as a modification of the motor device according to the present embodiment. The fan unit 1B illustrated in FIG. 9 is different from the fan unit 1 illustrated in FIG. 1 in that the fan unit 1B does not include the signal input terminal P3 and the drive command signal analysis unit 21. Since the fan unit 1B does not include the signal input terminal P3, the fan unit 1B does not include the input signal lines 51 illustrated in FIG. 2. In the fan unit 1B, the drive control signal generation unit 22 generates the drive control signal Sd for operating the motor 40 at a predetermined fixed rotation speed, not in response to the input of the drive command signal Sc from an external device. The other components of the fan unit 1B including the functional units implementable by the control circuit 2 are the same as those of the fan unit 1.

The functions of the abnormality determination processing unit 25 and the signal output unit 26 implemented by the control circuit 2 of the fan unit 1 described above can also be implemented in the fan unit 1B not including the drive command signal analysis unit 21. That is, also in the control circuit 2 of the fan unit 1B, when the abnormality determination signal Sa is generated by the abnormality determination processing unit 25, a process of outputting the abnormality determination signal Sa instead of the rotation speed signal Ss from the signal output unit 26 can be implemented. Consequently, also in the fan unit 1B, the accuracy of the abnormality determination process can be improved with a simple configuration as in the fan unit 1.

Figure 10:
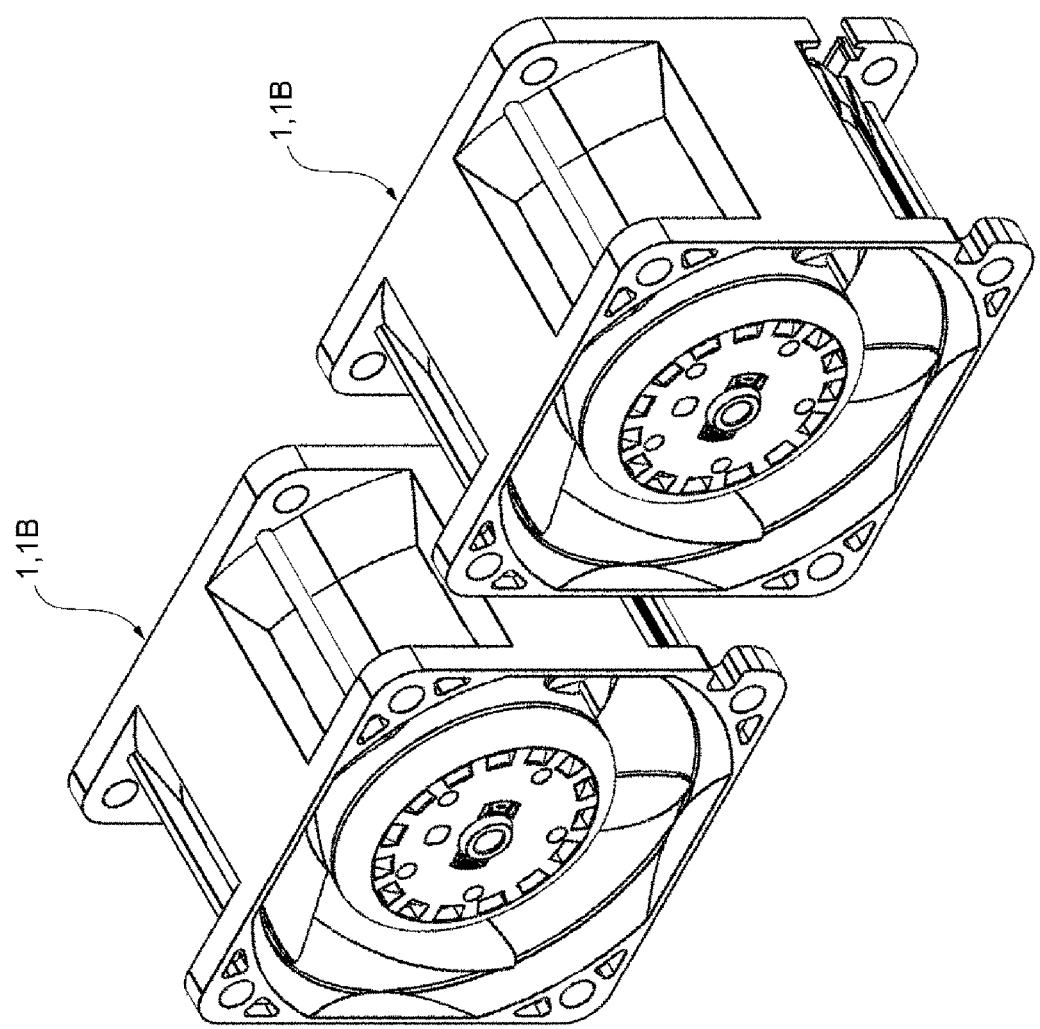
FIG. 10 is a schematic view illustrating an example of an arrangement of a plurality of fan units illustrated in FIG. 2.

FIG. 10 is a schematic view illustrating an example of an arrangement of a plurality of fan units 1, 1B. The fan units 1, 1B described above can also be applied to, for example, an electric device system such as a server device; in the electric device system, the motors 40 of the plurality of fan units 1, 1B disposed at each part of an electric device are driven to cool the electric device.

As illustrated in FIG. 10, in a server device including the plurality of fan units 1, 1B, the abnormality determination process by the control circuit 2 described above can be performed. In particular, in the server device including the plurality of fan units 1, 1B, even when the rotation speed of the motor 40 is changed by the influence of other fan units 1, 1B, erroneous detection of the abnormality determination signal Sa output from the signal output unit 26 instead of the rotation speed signal Ss can be prevented. The influence of other fan units 1, 1B means that the rotation speed is decreased by the influence of the flow of air from the other fan units 1, 1B or that the load of the impeller 41 is decreased and the rotation speed is increased by the influence of backflow (reverse rotation) when the other fan units 1, 1B fail. Even when the rotation speed of the motor 40 is changed by the influence of the other fan units 1, 1B, since the abnormality determination signal Sa output from the signal output unit 26 is distinguishable from the rotation speed signal Ss in the process implemented by the control circuits 2 of the fan units 1, 1B described above, the rotation speed signal Ss and the abnormality determination signal Sa can be prevented from being erroneously detected by an external device.

In addition, a person skilled in the art can appropriately modify the disclosure according to conventionally known knowledge. Such modifications are of course included in the scope of the disclosure as long as these modifications include the configuration of the disclosure.

For example, in the embodiment described above, the abnormality determination processing unit 25 and the signal output unit 26 are implemented in the control circuit 2 of the fan unit 1, 1B; however, the processes by the abnormality determination processing unit 25 and the signal output unit 26 may also be performed in a motor control device or a motor drive control device for controlling a motor other than the fan unit.

For example, in the embodiment described above, the temperature sensor 5 is provided at the bearings 43 and 44 of the fan unit 1, 1B; however, the position of the temperature sensor 5 is not limited to the position described above as long as the abnormality determination signal Sa can be output by predicting the life of the motor 40.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A motor control device comprising:
a drive control signal generation unit configured to generate a drive control signal for a motor in accordance with a target rotation speed of the motor and a rotation speed of the motor calculated in response to a rotation position detection signal of the motor;
a rotation speed signal generation unit configured to generate a rotation speed signal having a frequency corresponding to the rotation speed of the motor, in response to the rotation position detection signal of the motor;
an abnormality determination processing unit configured to determine whether a condition value for abnormality determination of the motor has reached a predetermined threshold value, for each predetermined abnormality determination period, and generate an abnormality determination signal distinguishable from the rotation speed signal when the abnormality determination processing unit determines that the condition value has reached the predetermined threshold value; and
a signal output unit configured to output the rotation speed signal generated by the rotation speed signal generation unit when the abnormality determination signal is not generated, and output the abnormality determination signal instead of the rotation speed signal or alternately output the rotation speed signal and the abnormality determination signal when the abnormality determination signal is generated.

2. The motor control device according to claim 1, wherein
the rotation speed signal is a periodic signal output at an interval according to the rotation speed of the motor, and
as the abnormality determination signal, one periodic signal is output in one abnormality determination period.

3. The motor control device according to claim 1, wherein the abnormality determination signal is one high voltage signal or one low voltage signal.

4. The motor control device according to claim 3, wherein as the abnormality determination signal, the one high voltage signal or the one low voltage signal is output for a predetermined time.

5. The motor control device according to claim 3, wherein the condition value is a value of a temperature acquired from a rotating portion of the motor.

6. A motor device comprising:
the motor control device according to claim 1: and
a drive circuit configured to drive the motor in response to the drive control signal.

7. A motor device comprising:
a motor;
an impeller attached to a rotation axis of the motor and rotated by a rotational force of the motor;
a rotation speed calculation unit configured to calculate a rotation speed of the motor in response to a rotation position detection signal of the motor;
a drive control signal generation unit configured to generate a drive control signal for the motor in accordance with a target rotation speed of the motor and the rotation speed of the motor;
a drive circuit configured to drive the motor in response to the drive control signal;
a rotation speed signal generation unit configured to generate a rotation speed signal having a frequency corresponding to the rotation speed of the motor, in response to the rotation position detection signal;
an abnormality determination processing unit configured to determine whether a condition value for abnormality determination of the motor has reached a predetermined threshold value, for each predetermined abnormality determination period, and generate an abnormality determination signal distinguishable from the rotation speed signal when the abnormality determination processing unit determines that the condition value has reached the predetermined threshold value; and
a signal output unit configured to output the rotation speed signal generated by the rotation speed signal generation unit when the abnormality determination signal is not generated, and output the abnormality determination signal instead of the rotation speed signal or alternately output the rotation speed signal and the abnormality determination signal when the abnormality determination signal is generated.

8. The motor device according to claim 7, wherein a rotation speed of the motor can be changed.

9. A server device including a plurality of the motor devices according to claim 7.

* * * * *